United States Patent
Carter, IV

[19]

[11] Patent Number: 6,056,800
[45] Date of Patent: May 2, 2000

[54] METHOD OF SIMULTANEOUSLY COMPOSTING ANAEROBIC AND AEROBIC MATERIAL

[76] Inventor: William J. Carter, IV, 3265 Hardin Rd., Boone, N.C. 28607

[21] Appl. No.: 09/253,099

[22] Filed: Feb. 19, 1999

Related U.S. Application Data

[63] Continuation-in-part of application No. 09/086,739, May 29, 1998.
[60] Provisional application No. 60/058,808, Sep. 15, 1997.
[51] Int. Cl.⁷ .............................. C05F 11/08; C05F 3/00; C12M 1/38
[52] U.S. Cl. .................. 71/9; 71/12; 71/23; 71/901; 435/290.1; 435/290.4
[58] Field of Search .................. 71/9, 12, 23, 901; 435/290.1, 290.4

[56] References Cited

U.S. PATENT DOCUMENTS

| | | | |
|---|---|---|---|
| 4,552,484 | 11/1985 | Nuttle | 405/128 |
| 5,190,572 | 3/1993 | Long | 71/9 |
| 5,206,169 | 4/1993 | Bland | 435/284 |
| 5,356,452 | 10/1994 | Fahey | 71/10 |
| 5,403,740 | 4/1995 | Menefee et al. | 435/287 |
| 5,417,736 | 5/1995 | Meyer | 71/9 |
| 5,432,088 | 7/1995 | Kakuk et al. | 435/316 |
| 5,457,031 | 10/1995 | Masse | 435/41 |
| 5,518,922 | 5/1996 | Sudrabin | 435/290 |
| 5,538,860 | 7/1996 | Castelli | 435/41 |
| 5,593,590 | 1/1997 | Steyskal | 210/603 |
| 5,695,986 | 12/1997 | Wold et al. | 435/290 |
| 5,766,876 | 6/1998 | Santiago et al. | 435/41 |
| 5,837,142 | 11/1998 | Mullerheim et al. | 210/650 |

FOREIGN PATENT DOCUMENTS 1646528  5/1991  U.S.S.R. ........................ 71/9

OTHER PUBLICATIONS

Rodale, J.I., "The Complete Book of Composting", p. 17, 45–50, 68, 1975.

*Primary Examiner*—Gary P. Straub
*Assistant Examiner*—Melanie C. Wong
*Attorney, Agent, or Firm*—Mills Law Firm, PLLC

[57] ABSTRACT

A method for composting organic waste materials utilizing aerobic and anaerobic decomposition processes simultaneously is disclosed. The method of the present invention is carried out by forming a compost pile of organic waste material which will decompose aerobically by microbes indigenous to the waste material. A cavity of predetermined size is formed within the compost heap and filled with alternating layers of organic waste material which will decompose anaerobically followed by a layer of waste material which will decompose aerobically until the cavity is filled. The parameters of the decomposition processes including temperature, water content, aeration, and moisture percolation are monitored to ensure that adequate conditions are met for both decomposition processes to proceed simultaneously. After a predetermined time interval has passed, the organic waste materials deposited within the central cavity of the compost heap are harvested to obtain a nutrient rich, soil additive. Thereafter, the central cavity is refilled with alternating layers of organic waste material and the decomposition cycle is repeated. The composting method of the present invention is adaptable to a wide range of composting operations ranging from a single compost pile to commercial scale operations involving a plurality of large compost piles being constructed using heavy equipment and managing the compost operation on a timed schedule.

17 Claims, 7 Drawing Sheets

```
          OOOOOOO
         OOOOOOOOO
        OOOOOOOOOOO
        OOOXOXOXOOOO
        OOOOXOXOOOOO
        OOOXOXOXOOOO
        OOOOXOXOOOOO
        OOOXOXOXOOOO
        OOOOXOXOOOOO
        OOOXOXOXOOOO
        OOOOXOXOOOOO
        OOOXOXOXOOOO
         OOOOOOOOOO
          OOOOOOOO
           OOOOOO
```

FIG. 2 A

```
        OOOOOOOOOOOOOOO
       OOOOOOOOOOOOOOOOO
      OOOOOOOOOOOOOOOOOOO
      OOOOOXXXXXXXXXOOOOO
     OOOOOOXXXXXXXXXOOOOOO
    OOOOOOOOOOOOOOOOOOOOOOO
    OOOOOOOOOOOOOOOOOOOOOOO
    OOOOOOOOXXXXXXXXXOOOOOOOOO
   OOOOOOOOOXXXXXXXXXOOOOOOOOO
   OOOOOOOOOOOOOOOOOOOOOOOOOOO
   OOOOOOOOOOOOOOOOOOOOOOOOOOO
   OOOOOOOOOXXXXXXXXXOOOOOOOOO
   OOOOOOOOOXXXXXXXXXOOOOOOOOO
   OOOOOOOOOOOOOOOOOOOOOOOOOOO
   OOOOOOOOOOOOOOOOOOOOOOOOOOO
   OOOOOOOOOOOOOOOOOOOOOOOOOOO
```

FIG. 2 B

```
        OOOOOO
       OOOOOOOO
      OOOOOOOOOO
     OOOXOXOXOOOO
    OOOXOXOXOXOOOO
   OOOXOXOXOXOXOOOO
  OOOXOXOXOXOXOXOOOO
 OOOXOXOXOXOXOXOXOOOO
OOOXOXOXOXOXOXOXOXOOOO
OOOXOXOXOXOXOXOXOXOOOO
OOOXOXOXOXOXOXOXOXOOOO
 OOOXOXOXOXOXOXOXOOOO
  OOOXOXOXOXOXOXOOOO
   OOOXOXOXOXOXOOOO
    OOOXOXOXOXOOOO
     OOOXOXOXOOOO
      OOOOOOOOOO
       OOOOOOOO
        OOOOOO
```

FIG. 3A

```
           OOOO
          OOOOOO
         OOOOOOOO
        OOOXOXOOOO
       OOOXOXOXOOOO
      OOOXOXOXOXOOOO
     OOOXOXOXOXOXOOOO
    OOOXOXOXOXOXOXOOOO
   OOOXOXOXOXOXOXOXOOOO
  OOOXOXOXOXOXOXOXOXOOOO
 OOOXOXOXOXOXOXOXOXOXOOOO
OOOXOXOXOXOXOXOXOXOXOXOOOO
OOOXO XO XO XO XO XO XO XO XO XO XOOOO
OOOXO XO XO XO XO XO XO XO XO XO XO XOOOO
```

FIG. 3B

METHOD OF SIMULTANEOUSLY COMPOSTING ANAEROBIC AND AEROBIC MATERIAL

CROSS-REFERENCE TO RELATED APPLICATION

This Application is a CIP of U.S. patent application Ser. No. 09/086,739 filed May 29, 1998, by William J. Carter for Method Of Simultaneously Composting Anaerobic and Aerobic Materials. This Appln claims benefit of Provisional Appln No. 60/058,808 Sep. 15, 1997.

BACKGROUND OF INVENTION

Field of Invention

This invention relates generally to composting or the decomposition of organic waste material and, more particularly, to an improved composting method using both aerobic and anaerobic processes.

The process of composting or transforming organic waste materials into natural fertilizers and/or soil additives is well-known to those skilled in the art. Organic waste materials can be composted either aerobically i.e. with air or, in the alternative, anaerobically i.e. without air.

In order for the composting process to provide optimal results, certain conditions must exist. For example, the micro-organisms which decompose the organic waste material require an environment with adequate amounts of air, water, and nutrients to support metabolic activity. In the case of aerobic composting, the ambient air is the primary source of oxygen. Thus, the circulation of ambient air within the compost pile must be sufficient to meet the metabolic requirements of the microbes as well as to disperse the waste gases including methane gas which are produced as a by-product of the process.

In addition, aerobic composting is affected by the moisture content of the organic materials. Thus, if the water content of the organic material is too high, the aerobic microbes will be killed off and only the slower process of anaerobic decomposition will proceed.

Conversely, if the moisture of the decaying materials is too low, the composting microbes will not survive. Consequently, the water and air content of the composted materials must be maintained within a certain range to provide the best results.

Composting proceeds most efficiently within a certain temperature range as with the case of any chemical reaction. Aerobic composting is accelerated if the compost pile is insulated such that the heat generated by the decaying process is contained within the compost pile. However, once the internal temperature of the organic material mass exceeds the desired temperature range for any length of time, the aerobic microbes are killed off and only slower anaerobic composting will take place. As a rule the gaseous by-products of anaerobic composting tend to be foul smelling and to pollute the environment.

Thus, the present method combines both aerobic and anaerobic composting methods which transforms organic waste materials into a nutrient rich soil additive and fertilizer and reduces the odor associated with the anaerobic process.

DETAILED DESCRIPTION OF RELATED PRIOR ART

U.S. Pat. No. 5,417,736 to Donald W. Meyer discloses a method for accelerated aerobic decomposition of vegetative organic waste material utilizing high flow-rate aeration, compaction of the organic material, and percolation of moisture released therefrom to provide beneficial soil amendments, fertilizers, and supplemental heat sources. This method utilizes a bag type container apparatus, a discharge blower component to effect high flow-rate aeration, a water injector apparatus, and temperature monitoring means which enhance the rate of aerobic decomposition.

U.S. Pat. No. 5,432,088 to Jay J. Kakuk et al. discloses a method and apparatus for aerobic composting. The apparatus of this invention includes a compost bin including a plurality of generally horizontal aeration/mixing slots. The slots permit mixing and aeration of the composting material. A mixing tool e.g. garden fork, can be inserted vertically into the mixing/aeration slots and pivoted to achieve thorough mixing of the compost material. However, this invention specifically relates to the aerobic composting of organic material such as grass clippings, leaves, and twigs.

U.S. Pat. No. 5,593,590 to Felix Steyskal discloses a process for separate treatment and disposal of mixtures of solid and liquid, organic wastes that is susceptible to at least partial microbiological degradation. The waste mixture is mechanically separated into a first sludge phase with enriched dry substance and a first liquid phase containing dilute solids. The first liquid phase is subjected to anaerobic treatment leading to formation of biogas and to the development of a second sludge phase and a second liquid phase. The first sludge phase is subjected to anaerobic treatment resulting in formation of compost, fertilizer or feed. A portion of the second sludge phase is recirculated into the starting mixture causing formation of biogas and facilitating decomposition of higher compounds contained in the starting mixture.

U.S. Pat. No. 5,538,860 to Luigi Castelli discloses a method and device for composting and drying of organic wastes which is employed for the collection and aerobic conversion on the spot of organic wastes so as to obtain a finished product, compost, intended for use as an agricultural improvement material.

U.S. Pat. No. 4,552,484 to David A. Nuttle discloses a composting container for field disposal of human feces through the use of composting containers that prevent the spread of intestinal bacteria, including virulent pathogens, which otherwise would occur in wilderness visitor's practice of the shallow burial of feces.

U.S. Pat. No. 5,403,740 to Jay Menefee et al. discloses a biodegradable compost bin comprising a housing made of an organic membrane which may be folded into a relatively small, compact shape for ease of storage in shipment. The compost bins, being made of a biodegradable material, can easily be removed from the composted materials contained therein after a full, composting season and disposed of by turning them into compost.

U.S. Pat. No. 5,457,031 to Ronald J. Masse discloses a composter having a spherical shape which allows the composter to be rolled on the ground to provide mixing. The composter includes a body having an opening and an internal, perforated aeration tube. A method for producing compost is taught for use with the composter.

U.S. Pat. No. 5,206,169 to Robert O. Bland discloses an animal carcass compost crib for the on-site disposal of animal carcasses accumulated during commercial operations in which passive solar energy is utilized to assist in the decomposition process. Aerobic, thermophillic bacteria multiply in the sunlight, solar heat and heat of the decomposition and convert nitrogenous material in carcasses and manure, as well as carboniferous cellulose added to the compost, to a bacterial biomass.

U.S. Pat. No. 5,356,452 to Robert E. Fahey discloses a method and apparatus for reclaiming waste material which enables reuse of a site dedicated to a landfill and also reuse of the components within the landfill. This invention provides for control and use of combustible and/or harmful gasses that are given off during the decomposition of the waste material.

U.S. Pat. No. 5,190,572 to Richard Long discloses a composting method and device including an assembly of stackable, rectangular double-walled plastic sub-units. Each sub-unit has four panels which are engaged in an interlocking relationship. The composter has a lid with a peripheral ridge on its under side for securely fitting around the top edge protrusions of the upper most sub-unit.

U.S. Pat. No. 5,837,142 to Steven B. Mullerheim, et al discloses a method and apparatus for treating residential waste water using membrane filtration for separating solid and liquid components of waste watering containing human sanitary waste for further treating the solid and liquid fractions into reusable products.

U.S. Pat. No. 5,518,922 to David A. Sudrabin discloses a composting system wherein the composting field is formed by a plurality of reinforced concrete plates each having a plurality of air nozzles formed therein. An air conditioning device controls the temperature and moisture content of the air which is introduced by an air manipulation device through the air nozzles into the base of the compost heap to provide an accelerated composting process.

U.S. Pat. No. 5,695,986 to Russell L. Wold, et al discloses a compost bin comprised of two flexible sheets which form a cylinder. Two openings are located on opposing sides of the cylinder. As material to be composted is piled in the bin, perforated air tubes are positioned at vertically spaced intervals in the composting matter. The air tubes provide sufficient oxygen to the composting mass and no manual turning, stirring, or tumbling is required.

Finally, U.S. Pat. No. 5,766,876 to Raphael Santiago discloses a composting bin comprising a plurality of vertical bin walls which surround a base and define a bin interior which contains the compostable matter. A plurality of apertures are formed into the vertical bin walls and a plurality of hollow ventilation tubes having perforations disposed about the periphery extend through the apertures. This device features a bio-filter bag comprising a porous material such that any gases which manage to escape the bin interior through the perforations will be effectively filtered.

SUMMARY OF THE INVENTION

After much research and study of the above mentioned problems, the present invention has been developed to provide an improved composting method that utilizes both aerobic and anaerobic composting processes simultaneously to produce a high-quality, nutrient rich soil additive.

This is accomplished by combining predetermined quantities of specific waste materials in layers within the compost heap to take advantage of the heat energy produced during the decomposition process and the percolation of water and gaseous by-products within the compost pile. The movement of gas and water through the decaying materials not only accelerates decomposition but also promotes a more uniform and nutrient rich material when the process is complete.

In view of the above, it an object of the present invention to provide a composting method which incorporates the advantages of both aerobic and anaerobic composting to produce a high quality, nutrient rich soil amendment.

Another object of the present invention is to provide a composting method which disposes predetermined quantities of organic waste materials within a compost heap in a layered arrangement so as to take advantage of the percolation of moisture and gaseous by-products generated in the process to reduce the offensive odors of anaerobic decomposition without the need for auxiliary control devices.

Another object of the present invention is to provide a composting method wherein the layered waste materials decompose within a central core of the compost heap utilizing the surrounding mass to filter and absorb the leachate produced by the decomposition process.

Another object of the present invention is to provide a composting method which is applicable to a variety of situations ranging from a single compost heap in a residential setting to a commercial scale composting operation utilizing a plurality of compost heaps on scheduled decomposition cycles.

Another object of the present invention is to provide for improvement in the construction and layout of commercial composting operations.

Other objects and advantages of the present invention will become apparent and obvious from a study of the following description and the accompanying drawings which are merely illustrative of such invention.

BRIEF DESCRIPTION OF THE DRAWINGS

FIG. 2A is a plan view of the compost heap of FIG. 1 representing schematically the distribution of aerobically and anaerobically decomposing materials in accordance with the present method;

FIG. 2B is a side elevation of the composting of FIG. 1 representing schematically the layers of aerobically and anaerobically decomposing material in accordance with the present method;

FIG. 3A is a plan view of a compost heap representing schematically the distribution of aerobically and anaerobically decomposing materials in accordance with an alternative method of the present invention; and FIG. 3B is side elevation of the compost heap of FIG. 3A representing schematically the distribution of aerobically and anaerobically decomposing materials in accordance with the alternative method of the present invention.

DETAILED DESCRIPTION OF THE PREFERRED EMBODIMENT

Figure 1:
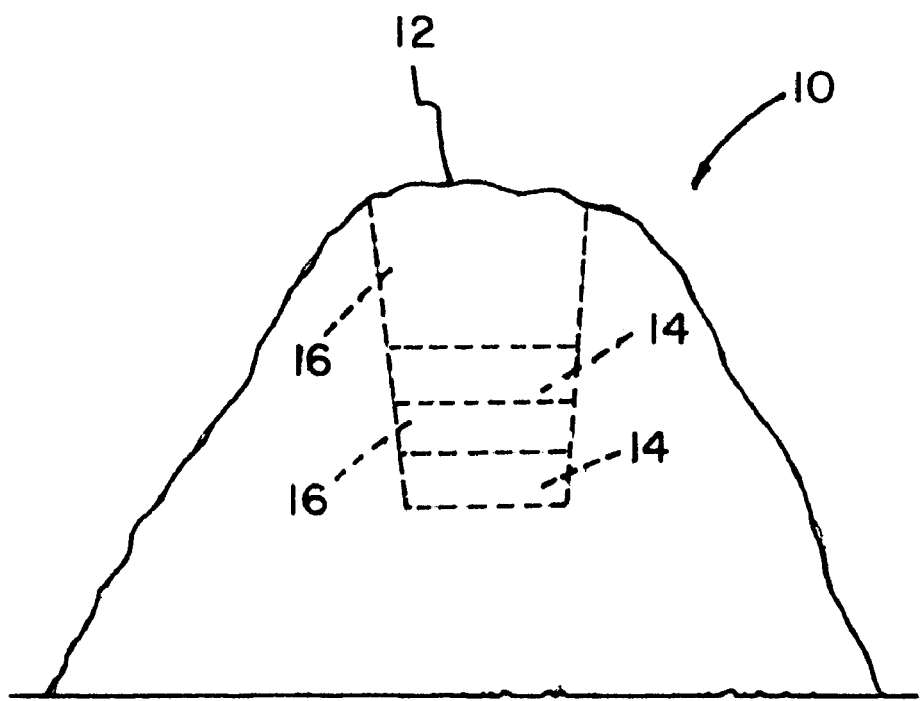
FIG. 1 is a diagramatic view of a compost heap illustrating the method of the present invention.

Composting is a controlled method of decomposition which transforms organic materials, either animal or vegetable, into a nutrient rich, brown earth-like substance call humus. While organic materials can be composted either aerobically i.e. with air or anaerobically i.e. without air by the bacteria indigenous to the waste material, the present invention exploits the characteristics and by-products of both processes in combination to obtain a nutrient rich, soil additive.

Composting is a self-decaying hot fermentation process and specific conditions must be met in order for this process to be most efficient. For example, the microorganisms, primarily bacteria, which decompose the organic materials require sufficient amounts of oxygen, water, and nitrogen. The metabolic rate of the decomposing bacteria is optimal at certain temperature ranges and, it is believed, in the absence of sunlight. Because the present invention is dependent upon providing a optimum environment for aerobic and anaerobic composting in combination, each of these conditions is discussed hereinafter in further detail.

Aerobic microbes need oxygen to metabolize efficiently. Ambient air is the normal source of oxygen for aerobic composting. Thus, the compost pile must have enough ambient air to meet the oxygen requirements of the bacteria and sufficient ambient air flow to carry off the waste gases and odors generated as a by-product of both aerobic and anaerobic decomposition processes.

Aerobic composting works best if the organic material is damp but not too wet. If there is too much water in the compost heap, the aerobic microbes will in effect be drowned and only the slower anaerobic composting process will occur. On the other hand, if the compost heap is too dry, the indigenous microbes will not thrive. Thus, a balance must be maintained between the oxygen and water content of the compost heap using the present method.

For purposes of this Application, the term "aerobic material" is defined as any organic waste material which will naturally compost or decompose aerobically i.e. with ambient air. Such materials may include but are not limited to hay, leaves, saw dust, and humus. The term "anaerobic material" is defined as any organic material which will naturally decompose anaerobically i.e. without air. Such materials include all animal matter and vegetable matter high in water content.

Bacteria and other microbes indigenous to the above material are utilized in the present composting method without adding extraneous decomposition-enhancing chemicals or bacterial cultures. Because innoculants of this type are expensive and require additional monitoring of the process, a considerable cost-savings is realized in comparison to methods of the prior art.

However, a reasonable equivalent of the method of the present invention in which the addition of chemical and bacterial innoculants may benefit the decomposition process is considered to be within the scope of the present invention.

In accordance with the composting method of the present invention, a pile or heap of aerobic material is formed, indicated generally at 10 and illustrated in FIG. 1.

In a preferred technique, the compost heap 10 is formed using conventional earth-moving equipment (not shown) so as to measure approximately 10 foot wide by 10 foot long by 10 foot deep. It will be noted that the heap 10 is formed from any of the above described aerobic materials or a combination thereof including particles and pieces of random size.

Thereafter, a central cavity 12 is dug in the top of the heap measuring approximately four feet wide by six feet long by six feet deep. It will be understood that these dimensions are approximate and that variation in the dimensions will occur due to the size and consistency of the aerobic material.

Next, a layer of anaerobic material 14 as described hereinabove is deposited into the hole 12 to a depth of approximately one foot. Thereafter, the anaerobic layer 14 is covered by a layer of aerobic material 16 approximately one foot deep.

Next, another layer of anaerobic material 14 is added over the previous layers.

Finally, the remaining upper portion of the cavity 12 is filled with aerobic material 16. It will be noted that the uppermost layer of aerobic material is approximately three feet in depth in order to absorb the gaseous by-products which are produced by decomposition of the anaerobic layers 14 and which tend to be foul smelling and are considered a form of environmental pollution unacceptable to those residing in close proximity to the composting operation. The distribution of the aerobic and anaerobic layers 14 and 16 respectively is shown schematically in FIGS. 2A and 2B wherein "O" represents aerobic material and "X" represents anaerobic material.

Aerobic decomposition is a function of the internal temperature of the waste material and the aerobic bacteria indigenous to it and proceeds efficiently at temperatures ranging from about 90–160 degrees Fahrenheit. As a rule at temperatures above or below this range bacterial activity declines significantly.

An inventive aspect of the present method includes control of decomposition by the volume and relative position of the aerobic and anaerobic material. It has been determined after much experimentation that the arrangement of materials illustrated in FIG. 1 provides sufficient aeration, moisture, and temperature control for both aerobic and anaerobic processes to occur simultaneously. Further, the placement of the decomposing anaerobic materials intermediate the aerobic layers 16 significantly reduces the foul-smelling gasses typical of anaerobic bacterial activity such that decomposition proceeds effectively without the need for auxiliary air cleaning or control devices.

It will be appreciated by those skilled in the art that the depth of both the anaerobic layers 14 and the aerobic layers 16 may vary over a wide range depending upon the moisture content and the particulate size of the respective material layers. Thus, the embodiments shown are intended to be merely illustrative and not restrictive in any sense.

Bulking agents such as straw, wood chips and similar organic materials may be used with the present method to promote aeration and enhance aerobic decomposition by creating air spaces and passages within the vegetative mass. As a result, optimal aerobic temperatures may be obtained more readily.

A bulking agent may comprise about 10–75% by weight of the organic material to be decomposed. The exact amount utilized depends on the compaction susceptibility of the waste material and its moisture content and particulate size.

Of course, periodic monitoring of the compost heap using the present method will be required to determine the rate of decomposition and to verify acceptable levels of ambient air circulation, moisture content, and temperature. These parameters can be measured by the use of a moisture detection probe (not shown), a temperature probe (not shown), and an oxygen/$CO^2$ detection probe (not shown) which can be inserted directly into the compost heap 10 to obtain measurements of the decomposition process.

Since such instrument probes are in a practical state of development, a detailed discussion of the same is not deemed necessary.

In practical use, it has been determined that the composting process in accordance with the present method requires three to four months duration in order to adequately decompose the core of waste materials deposited within the central cavity 12. After the passage of such three to four months interval, the core of waste materials originally deposited in the central cavity 12 is scooped out of the compost heap 10 using a backhoe (not shown) or other similar equipment and the decomposed organic waste material is ready for use as a soil additive. The remainder of the compost heap 10 is ready for re-use by the present method and is again refilled with alternating layers of anaerobic and aerobic materials as described hereinabove.

It is critical to the present method that the outer portion of the compost heap 10 surrounding the central cavity 12 remains undisturbed for an indefinite number of decomposition cycles over a period of several years.

It has been determined that repeated use of the compost heap 10 in accordance with the present method effectively seasons the compost heap 10. That is, as decomposition of the waste materials proceeds in the central cavity 12 the percolation and leaching of moisture and nutrients into the surrounding walls of the central cavity 12 results in breaking down the dry, organic materials into progressively finer particles with each subsequent decomposition cycle. This is due in significant part to the naturally occurring earth worms and other larvae which are attracted to the decomposing animal and vegetable materials within the core.

Thus, the outer portion of the compost heap 10 surrounding the core functions to filter the leachate as it percolates outwardly and downwardly through the compost heap. Using the present method it has been observed that the decomposition of the waste materials proceeds more efficiently in such a seasoned compost heap 10 and that any releasable moisture from the decomposition of the waste materials is absorbed in the outer portion of the compost heap.

Figure 4:
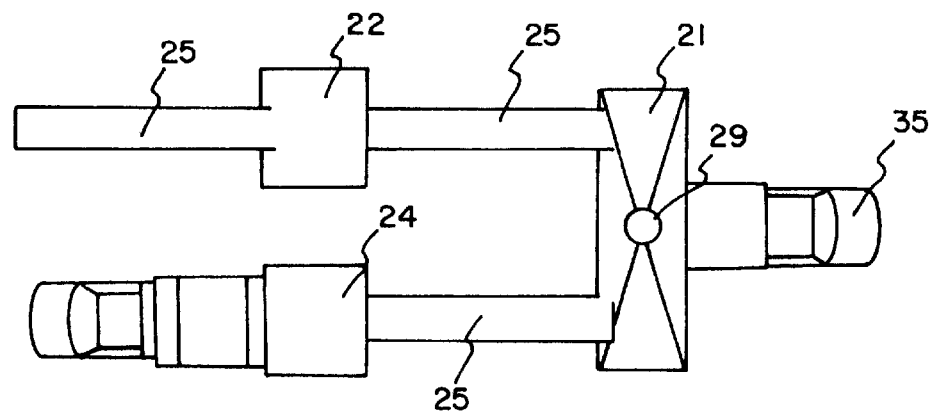
FIG. 4 is a plan view of a staging area wherein the organic waste materials are stored prior to comminution into pieces of a uniform size by use of a grinding device.

In an alternative method of composting in accordance with the present invention, equal parts of aerobic material and anaerobic material are processed together using a shredder device 20 as depicted in FIG. 4. In utilizing this method separate containers 22 and 24 are provided for the storage of dry, organic materials (i.e. aerobically decomposing) and animal and vegetable materials (i.e. anaerobically decomposing) respectively.

After a sufficient quantity of both materials have been brought to the site as by vehicles 35 and accumulated in containers 22 and 24, the materials are conveyed by conveyor belts 25 to an open hopper 21 coupled to the shredder device. The shredder device 20 is capable of reducing both the organic materials and the animal and vegetable materials to a predetermined particulate size. Any number of commercially available shredder devices capable of comminuting both aerobic and anaerobic materials into particles measuring less than 1" in diameter are suitable for this purpose.

The dry, organic materials are mixed with the shredded animal and vegetable materials in a pre-determined ratio according to the particular type of material, particulate size, and moisture content. In a preferred method the ratio of dry, organic materials to animal/vegetable material can vary widely but typically ranges from about 1:3 to about 3:1; and highly preferred at about 2:1.

After the shredding process is completed, the admixture of materials is loaded onto vehicles 35 for transport to the composting site.

The admixture is arranged in piles in a suitable location and covered with a layer of dry, organic material which is approximately 6 to 12 inches in thickness.

This alternative composting method is illustrated schematically in FIGS. 3A and 3B wherein "O" represents the aerobic material and "X" represents the anaerobic material.

The relatively uniform particulate size of the organic materials obtained by the shredding process provides for a uniform flow of ambient air and percolation of releasable moisture throughout the organic material to optimize the decomposition process.

In all other aspects the parameters of this alternative method are monitored as described hereinabove to insure adequate aeration, water content, and temperature range.

It has been observed that utilizing this alternative method enables the decomposition process to proceed more efficiently and the entire volume of the compost heap is converted to soil additive with each cycle.

Figure 5:
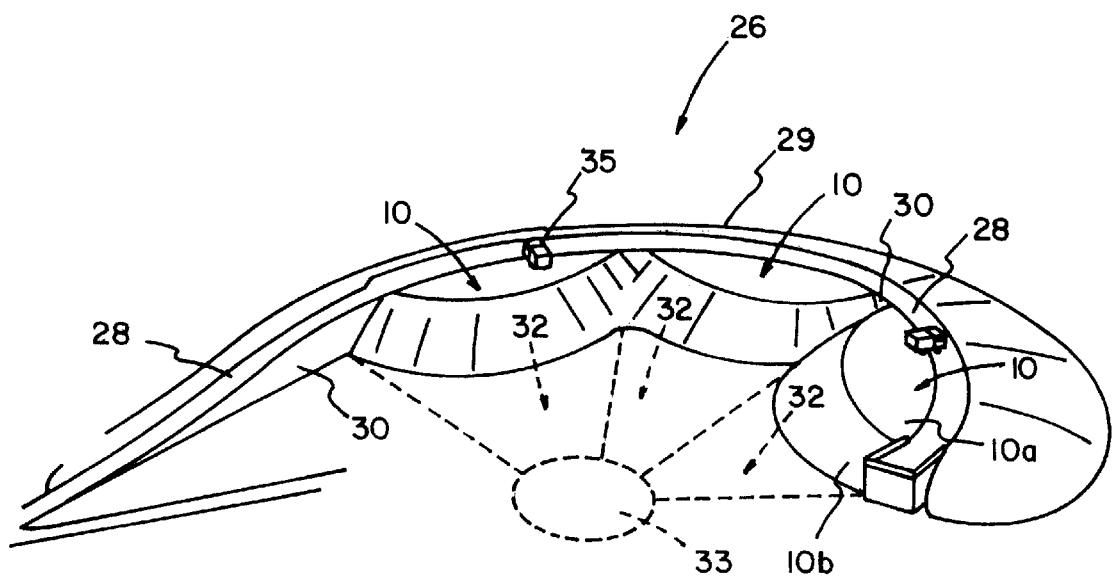
FIG. 5 is a perspective view of a commercial composting site wherein the present composting method is utilized.

FIG. 5 is a perspective view of one embodiment of a commercial composting site, indicated generally at 26, utilizing the basic method of the present invention as described hereinabove. In this embodiment a generally semi-circular wall 30 of reinforced concrete or other suitable material is constructed to partially enclose the composting site 26. In a preferred embodiment the height of the wall 30 ranges from about 10 to 40 feet and preferably about 30 feet.

The road bed 28 is constructed to provide access for vehicles 35 and other heavy equipment to a staging area 29 at the top of the wall 30.

The so-called leach field, indicated generally at 32, whereon each compost pile 10 will be formed is graded in accordance with industry regulations to provide adequate run-off and containment of water and any excess leachate formed during the filling of the cavities 12 within each compost pile 10.

Depending upon the geographic location and the amount of rainfall at a given site 26, it may be advantageous to form a basin 33 (shown in phantom outline) in the leach field 32 and to grade the leach field so that any excess run-off or any excess leachate formed flows to the basin 33.

It will be appreciated by those skilled in the art that by constructing each compost pile 10 against the semi-circular wall 30, the potential leach fields 32 (defined by broken lines) in FIG. 5 are significantly reduced in comparison to a free standing compost pile as depicted in FIG. 1.

More particularly, it will be understood by those skilled in the art that the leach field 32 associated with each compost pile 10 shown in FIG. 5 is less than 180° as compared to a 360° leach field surrounding the free standing compost pile depicted in FIG. 1. Further, by grading within each respective leach field 32 to produce a generally concave, tapered trough from the base of each pile 10 to the basin 33, the potential leach field and the flow of any excess leachate from each compost pile 10 can be further reduced.

Figure 6:
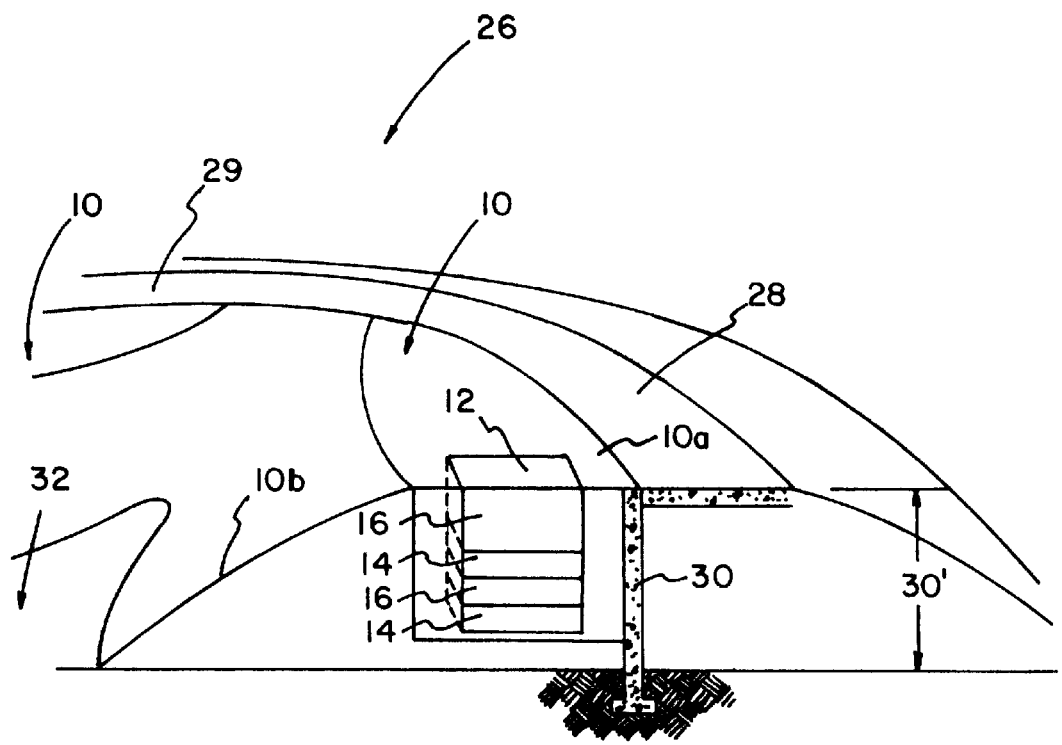
FIG. 6 is a cross-sectional view taken through a compost heap as depicted in FIG. 5 showing the details thereof.

Turning now to FIG. 6 there is shown therein a sectional view taken through a compost pile 10 as depicted in FIG. 5.

Shown in this view is a cavity 12 which has been formed in the dry organic materials which make up the bulk of the compost pile 10.

In accordance with the present invention, the cavity 12 is filled with alternating layers of anaerobic material 14 in a predetermined amount followed by a layer of aerobic materials 16 and so on until the cavity 12 is finally capped off with a relatively thicker layer of aerobic material 16 to absorb the gaseous by-products which are produced by the decomposition of the underlying anaerobic layers 14.

Because the overall dimensions of the compost heap in FIG. 6 are approximately three times greater than the compost pile depicted in FIG. 1, it will be understood that the dimensions of the cavity 12 and the thickness of the underlying layers of decomposing waste materials may be proportionately greater depending upon the moisture content and the particulate size of the respective material layers.

Figure 7:
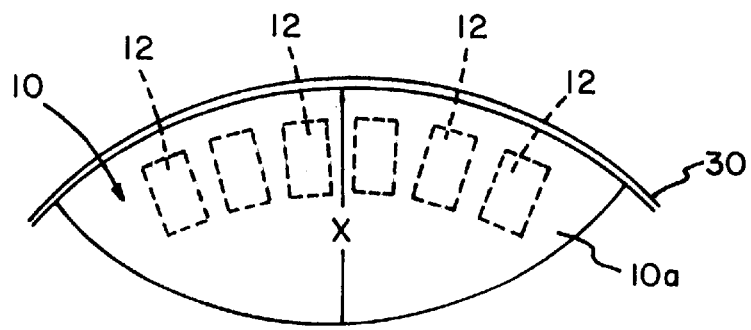
FIG. 7 is an enlarged plan view showing the top surface of a compost heap as depicted in FIG. 5 including a plurality of cavities formed therein.

Due to the increased size of the compost heap 10 depicted in FIGS. 5 and 6, it will be understood that a plurality of cavities 12 can be formed in side-by-side relation with adequate spacing therebetween as seen in FIG. 7. After the first cavity is filled by the above method and a decomposition cycle begins, the method is repeated in the next adjacent cavity 12. This process would be repeated for all of the cavities 12 formed within the compost heap 10.

After the first cavity has been filled, it is monitored to determine the rate of decomposition and to verify acceptable levels of ambient air circulation, moisture content and temperature in a manner similar to that of the basic method described hereinabove.

In practical use, the decomposition cycles within each separate cavity 12 shown in FIG. 7 will be managed on a timed schedule such that the decomposition cycle occurring in the first cavity is completed and ready for harvest when the last cavity 12 in the sequence is ready to be filled. Obviously, in this manner the production of composted waste materials can be maximized.

Figure 8:
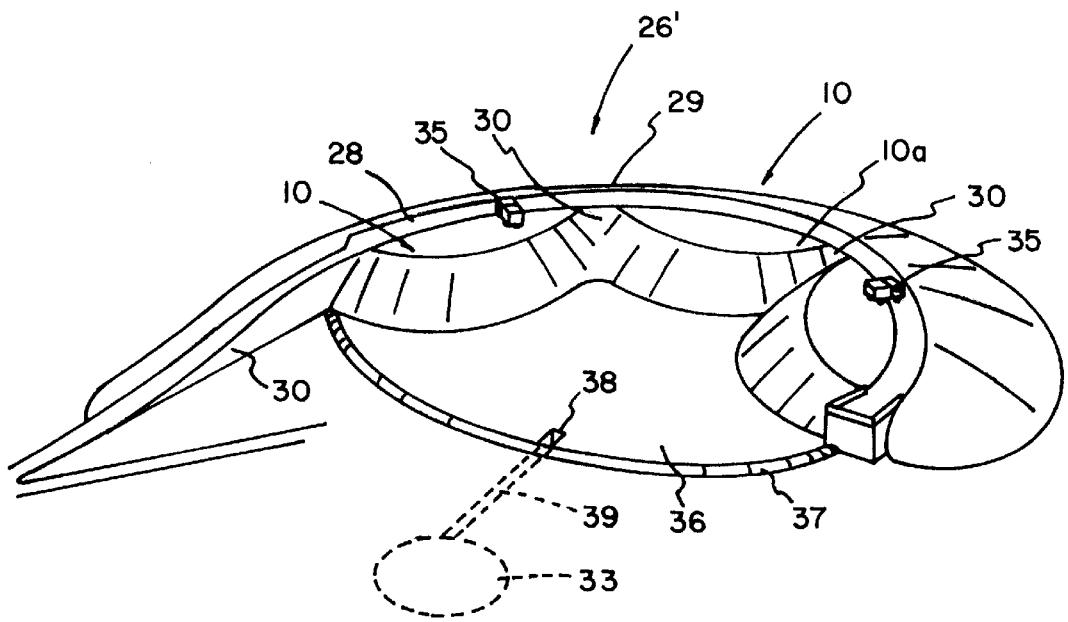
FIG. 8 is a perspective view of an alternative embodiment of the commercial composting site modified to include a concrete slab.

Turning now to FIG. 8, there is shown therein an alternative embodiment of a commercial composting site, indicated generally at 26', also utilizing the basic method of the present invention as described hereinabove. In this embodiment, a generally semi-circular wall 30 of reinforced concrete is also constructed to partially enclose the composting site 26'.

In this embodiment a road bed 28 is also constructed to provide access for vehicles 35 and other heavy equipment to a staging area 29 at the top of the wall 30.

However, this embodiment differs from that depicted in FIG. 5 in that a reinforced concrete slab 36 including a raised, peripheral dam 37 is constructed over the leach fields 32 extending from the foot of the wall 30 so as to underlie each of the compost heaps.

The slab 36 is provided with a drain 38 in fluid communication with an underground conduit 39 which carries any excess runoff or leachate into the basin 33 (shown in phantom outline).

Figure 9:
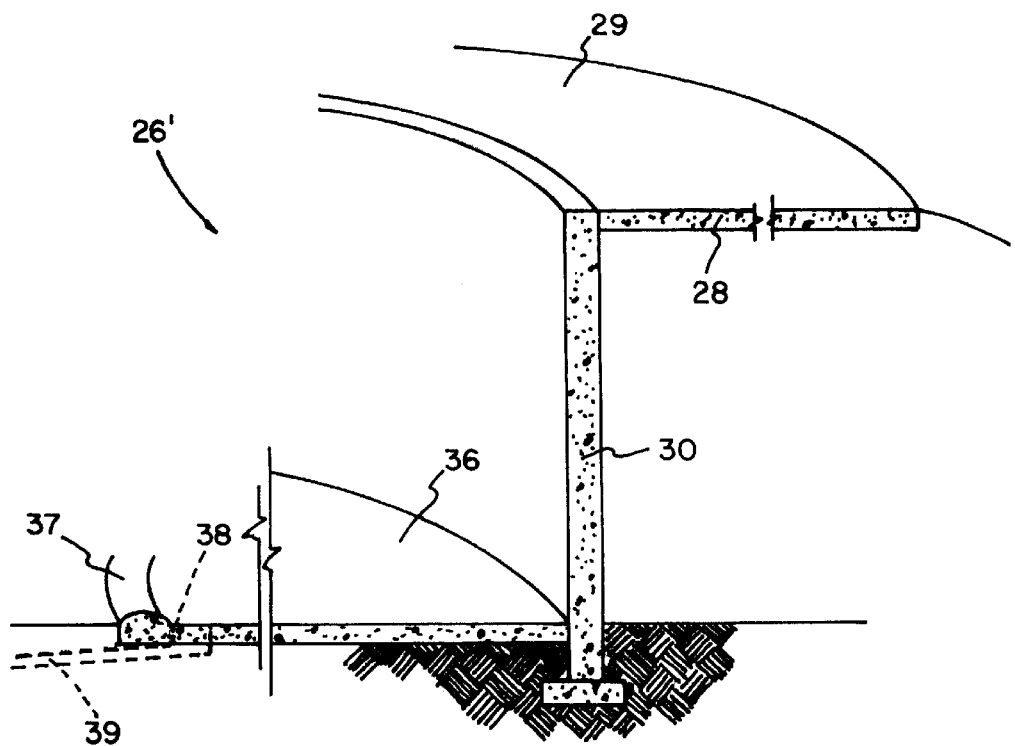
FIG. 9 is a cross-sectional view taken through a compost heap as depicted in FIG. 8, showing the details thereof.

Of course, the slab 36 is constructed such that excess runoff flows toward the dam 37 and is contained and follows the downwardly and outwardly graded slab 36 until it reaches the drain 38 as more clearly shown in FIG. 9.

In all other respects, the commercial composting operation proceeds in the manner disclosed hereinabove. The concrete slab 36 provides adequate assurance that the composting operation will be carried out in an environmentally safe manner without contributing to groundwater pollution.

Figure 10:
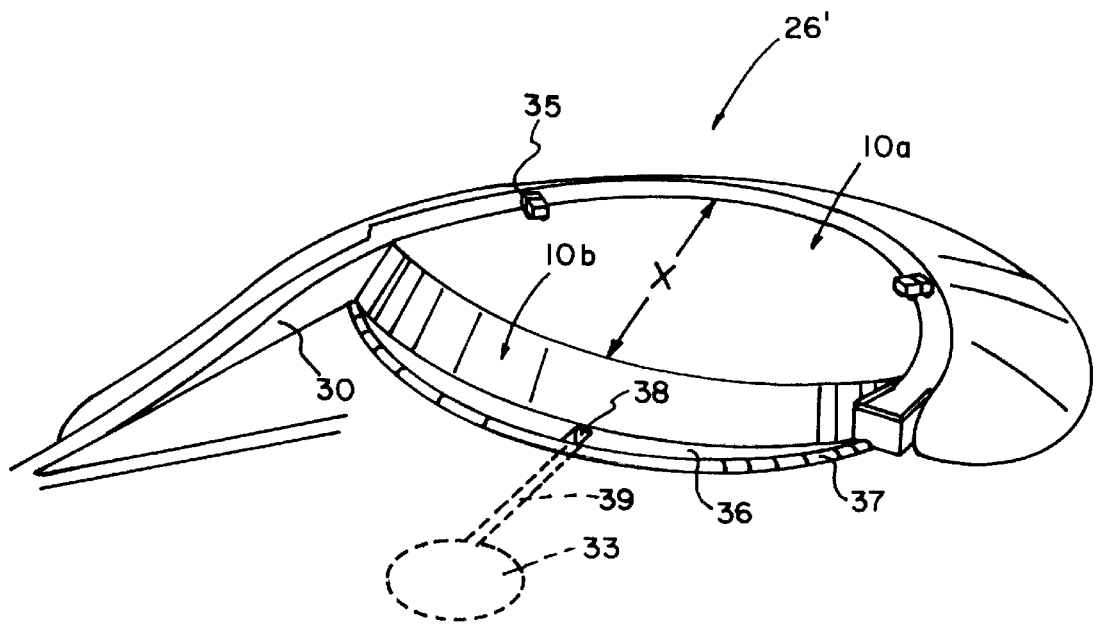
FIG. 10 is a perspective view of the commercial composting site of FIG. 8 after additional dry, organic materials have been added to the leading edge of each of the compost piles, thereby merging them into one large pile.

It will also be noted that the leveled off, top surface 10a of each compost pile 10 as depicted in FIGS. 5 and 8 can be gradually increased in size to accommodate additional rows of cavities 12 (not shown) by adding dry organic materials to the leading edge 10b of the compost pile resulting in the merger of the individual piles as shown in FIG. 10. Thus, as additional dry, organic materials are added to the forward slope 10b, the dimension "X" as shown in FIGS. 7 and 10 is increased to accommodate additional rows of cavities (not shown) to increase production of the composted product.

Figure 11:
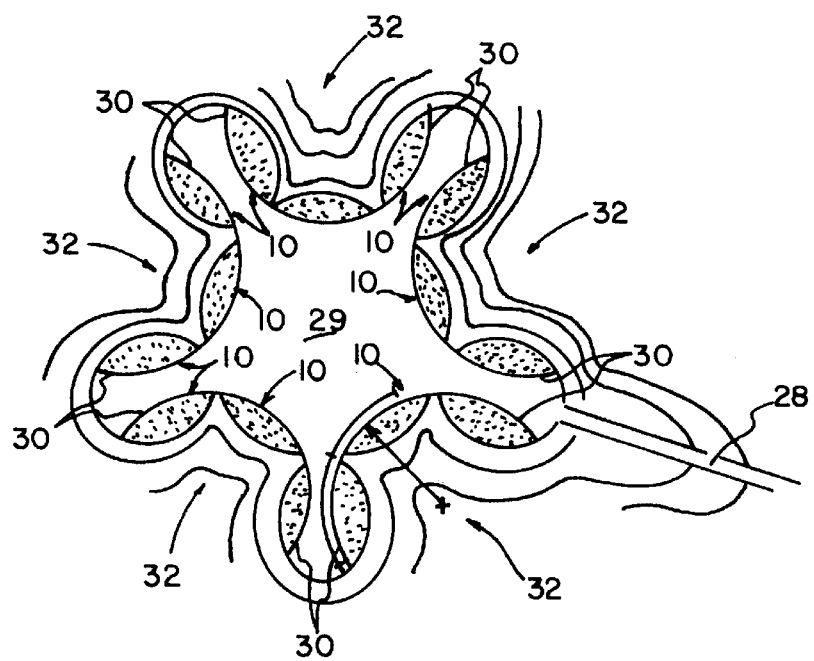
FIG. 11 is a plan view showing the layout of a commercial composting operation containing a plurality of composting sites.

To this end, additional semi-circular walls 30 each defining a separate composting site 26 are constructed in generally concentric relation about a centrally located staging area 29' as shown in FIG. 11. Such a large scale commercial composting operation would cover an area of approximately 20 to 25 acres and be capable of continually composting virtually all of the organic waste materials of a sizeable municipality. In addition to producing a substantial volume of nutrient rich, soil amendment, such a commercial composting operation would significantly reduce the acreage lost to conventional landfills.

Further, it is believed that the commercial composting method described herein can be carried out in an environmentally safe manner without contributing to ground water and air pollution. The present invention limits the amount of leachates produced in decomposition as the result of liquids percolating through the organic waste materials and it is believed will comply with current regulations to afford maximum protection of the ground water in the vicinity.

Although the present commercial composting sites 26 and 26' have been described herein in combination with a semi-circular concrete wall 30 to reduce the effective leach field to less than 180° arc of a circle, it will be appreciated by those skilled in the art that alternative constructions of the wall may be as effective and are intended to be within the scope of the present invention.

From the above it can be seen that the present invention provides composting methods wherein both aerobic and anaerobic processes are combined to obtain the advantages of each process.

The present composting methods combine animal and vegetable waste products high in water content with relatively dry organic materials such as hay, saw dust and the like to create a nutrient rich, soil additive without adding extraneous chemicals or bacteria cultures in a relatively short time cycle.

Because such extraneous chemicals and bacteria cultures are relatively expensive and require additional controls, a considerable cost savings is realized by the present methods.

The terms "top", "bottom", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of composting comprising the steps of:
   (a) forming on a solid base a compost heap of aerobic material;

(b) removing from the top of sais heap a substantial amount of said aerobic material to form an upwardly opening cavity defined by a lower portion spaced from said base and by peripheral sides;

(c) filling a portion of said cavity with a mixture comprising anaerobic material and aerobic material, said mixture having an upper surface terminating below the top of said heap;

(d) covering said upper surface with a layer of aerobic material to form a lid for said heap;

(e) providing sufficient amounts of aerobic material as said lid and said peripheral sides to maintain conditions effective for decomposition of said mixture;

(f) maintaining said mixture undisturbed during said decomposition;

(g) removing said mixture after decomposition from said cavity leaving in place said peripheral sides thereby creating a replacement cavity;

(h) refilling said replacement cavity with a new mixture of aerobic material and anaerobic material; and (i) covering said new mixture with a layer of aerobic material forming a new lid for said heap.

2. The method of composting as recited in claim 1 wherein said base is concrete.

3. The method of composting as recited in claim 1 wherein said base is graded soil.

4. The method of composting as recited in claim 1 wherein said base is in the form of a concrete slab.

5. The method of composting as recited in claim 1 wherein said mixture is in the form of alternating layers of anaerobic material and aerobic material.

6. The method of composting as recited in claim 1 wherein the ratio of aerobic material to anaerobic material in said mixture is in the range of about 3:1 to 1:3.

7. The method of composting as recited in claim 6 wherein said mixture is in the range of about 2 parts aerobic material to 1 part anaerobic material.

8. The method of composting as recited in claim 1 including the step of confining a portion of said peripheral sides with a solid wall.

9. The method of composting as recited in claim 8 including the step of confining a portion of said peripheral sides with a vertically extending concrete wall.

10. The method of composting as recited in claim 9 wherein said concrete wall is concave.

11. The method of composting as recited in claim 10 wherein said wall is arcuate.

12. The method of composting as recited in claim 1 including the step of forming additional heaps adjacent to the original heap.

13. The method of composting as recited in claim 12 including the steps of serially forming a cavity in each of said heaps in accordance with steps (b) of claim 1.

14. The method of composting as recited in claim 13 including the steps of serially processing said additional heaps in accordance with steps (c) through (g) of claim 1.

15. The method as recited in claim 1 including the step of admixing with said anaerobic material a bulking agent of an organic material effective to create air spaces and passages within said aerobic material for promoting aeration and enhancing aerobic composition.

16. The method as recited in claim 15 wherein said bulking agent is selected from the group consisting of straw, wood chips and organic materials effective for promoting aeration.

17. The method of composting as recited in claim 1 including the step of particulating said aerobic material and said anaerobic material prior to forming said mixture.

* * * * *